United States Patent [19]

Anderson

[11] 3,826,959
[45] July 30, 1974

[54] BYPASS CONTACTOR CIRCUIT
[75] Inventor: Albert W. Anderson, Roanoke, Va.
[73] Assignee: General Electric Company, Salem, Va.
[22] Filed: June 13, 1973
[21] Appl. No.: 369,510

[52] U.S. Cl............... 318/139, 318/345, 321/45 C
[51] Int. Cl. .................................... H02p 1/00
[58] Field of Search........... 318/139, 345; 321/45 C

[56] References Cited
UNITED STATES PATENTS
3,329,842  7/1967  Brown........................... 318/345 X
3,619,753  11/1971  Thompson...................... 318/345
3,764,870  10/1973  Morton et al.................. 318/139

Primary Examiner—G. Z. Rubinson
Attorney, Agent, or Firm—Frederick W. Powers, III; Harold H. Green, Jr.

[57] ABSTRACT

Means for preventing drive train slap in an electric vehicle during the closure of a thyristor bypass contactor. Upon closure of a manually-operated switch, a timer is energized. If the switch remains closed for a predetermined period means are energized to prevent commutation of a thyristor providing current to the vehicle motor, and current is supplied to a relay winding for closing the contacts bypassing the thyristor. Overriding means are provided to ensure energization of the relay coil in the event that the manually-operated switch is opened before the coil is fully energized.

8 Claims, 1 Drawing Figure

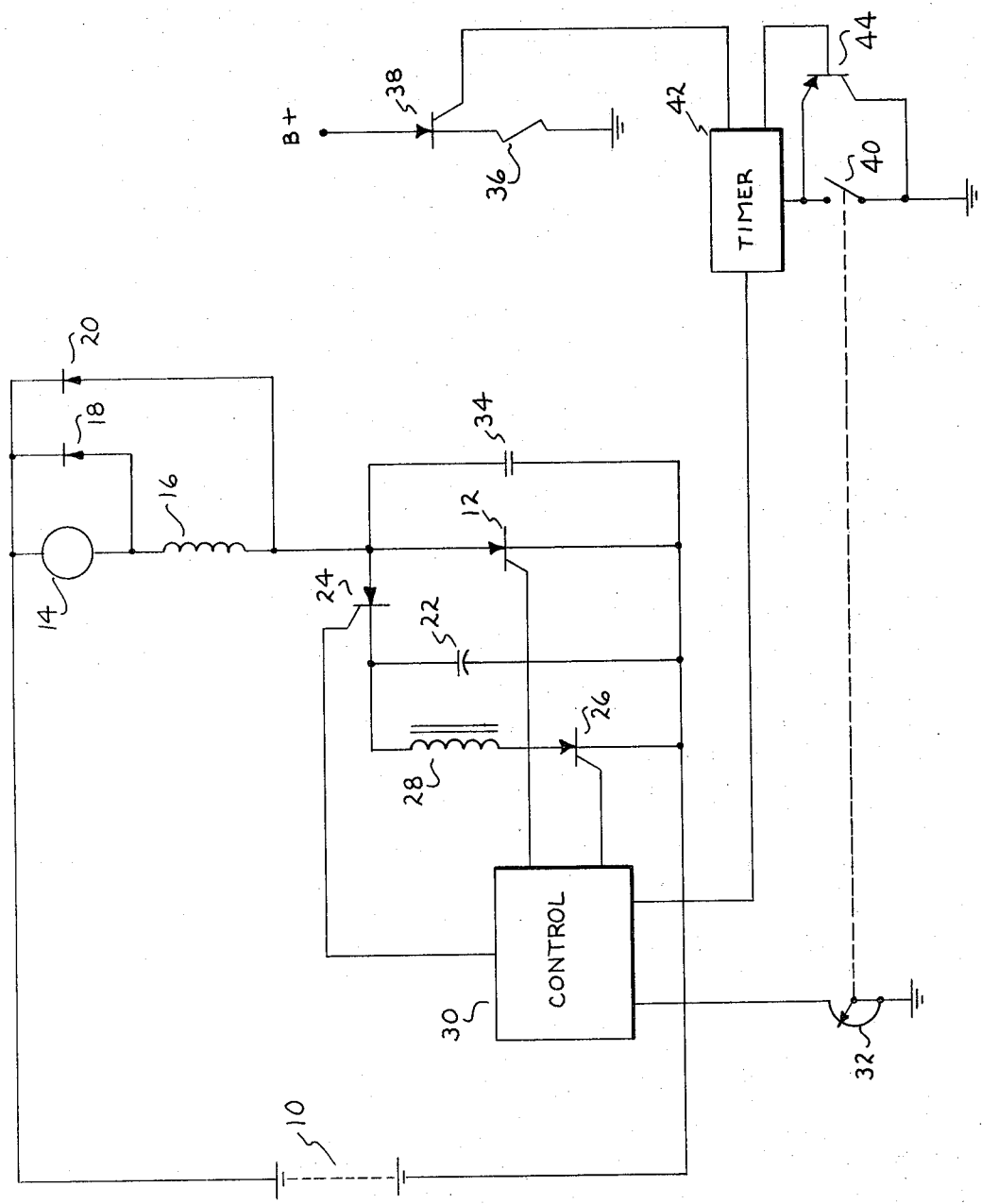

3,826,959

BYPASS CONTACTOR CIRCUIT

BACKGROUND OF THE INVENTION

The present invention relates to electric vehicle controls and, more specifically, to means for ensuring a smooth transition between motor current flow through a gated thyristor, and through an electromechanical bypass contactor.

Over the years current control in electric vehicles has been accomplished in a number of ways. Initially switched resistors, continuously-variable resistors using mechanical adjustments, and continuously-variable resistors of the carbon-pile variety have all been utilized with varying degrees of success. Recently, the development of certain types of switchable power transistors has led to the widespread use of solid-state time-ratio controls for DC motors in electric vehicles.

Time-ratio control in the present context is achieved by the rapid switching in and out of conduction of a power transistor, such as a gated thyristor. The percentage of conductive to non-conductive time of the thyristor determines the percentage of source voltage which is effectively applied across the terminals of the motor. By varying the conductive to non-conductive operation of the thyristor, referred to herein as the mark-space ratio, continuously-variable speed control is afforded which avoids many of the problems of prior-art controls such as high $I^2R$ losses.

Certain disadvantages, however, attend the provision of time-ratio control by means of power transistors. For instance, with the most popular type of gated thyristor, the silicon controlled rectifier (SCR) it has been found that even when the mark-space ratio approaches infinity (full on-time conduction) the resistive drop across the thyristor is not insubstantial. Further, continued conduction of the thyristor may result in the overheating thereof, culminating in the destruction of the device. For this reason, it has been found advisable to provide an electromechanical switching device in shunt about the SCR in order to apply maximum available source voltage across a motor for prolonged periods of time. Such a device, termed a bypass contactor, commonly takes the form of a relay having a winding which is energized upon demand by switching means linked to a manual speed-control device.

Implementation of the aforementioned system has given rise to additional problems. In order to shut off, or commutate, an SCR it is necessary to provide means for cutting off current flow therethrough, or equivalently to back-bias the device. This is commonly achieved through use of well-known circuits which charge a capacitor, reverse the charge thereof, and apply the reverse voltage thus provided across the terminals of the SCR. In some cases, the closure of a bypass contactor allows the charge accrued on the commutating capacitor to bleed off, so that when time ratio control is reinstituted it is impossible to commutate the SCR in the normal manner.

It has been found desirable to provide a signal which effects commutation of the SCR and at the same time causes current to be applied to the relay winding for operating the bypass contactor. However, due to the inherent inductive time constant of the contactor winding and to the inertia of the contacts, commutation of the SCR is achieved before closure of the bypass contactor takes place. Power will thus be removed from the traction system for an instant then full power will be reapplied through the contactor, causing a surge in motor operation. The surge operates to take up the backlash in the drive system, producing an objectionable "slap" in the drivetrain which over a period of time can injure the components thereof. It will therefore be understood that it would be desirable to provide means for facilitating a smooth transition between time-ratio control and bypass contactor conduction in an electric vehicle.

It is therefore an object of the present invention to provide improved means for operating a bypass contactor in an electric vehicle control system.

It is another object of the present invention to provide means for achieving operation of a bypass contactor which prevents an objectionable discontinuity in supplied power.

SUMMARY OF THE INVENTION

Briefly stated, in accordance with one aspect of the invention the foregoing objects are achieved by providing a switch operatively coupled to a vehicle control. The switch is operated when the control reaches a predetermined position, and effects the energization of a timer. If the switch remains closed long enough to allow the timer to time out, a signal is produced to inhibit commutation of a gated thyristor and to effect closure of a bypass contactor coupled in shunt about the thyristor. At the same time, override means are energized to prevent the re-opening of the switch from forestalling actuation of the bypass contactor.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing, which comprises a schematic representation of an electric vehicle control system embodying the present invention.

DESCRIPTION OF THE PREFERRED EMBODIMENT

The single FIGURE represents, in schematic form, a portion of a time-ratio control system adapted for use in an electric vehicle with a DC traction motor. A source of DC power such as a battery 10 is coupled in series relationship with a gated thyristor, shown here as SCR 12, and a DC motor comprising an armature 14 and field 16. Diode 18 is connected in reverse shunt about the armature, and a flyback diode 20 is coupled across the motor for continuing current through the series-connected armature and field windings during interpulse periods. A capacitor 22 is provided for commutating thyristor 12 at predetermined intervals, and controlled rectifiers 24 and 26 along with the inductor 28 are provided to effect the charging and subsequent reversal of charge upon the capacitor. A control 30 serves to operate SCR's 12, 24 and 26 at predetermined times, the time-ratio of conductivity of thyristor 12, referred to as the mark-space ratio, being controlled in response to the setting of a manual speed control 32. Speed control 32, here shown as a potentiometer, advantageously takes the form of a variable resistance coupled to a manually-operated element such as an accelerator pedal; adjusting the value of potentiometer 32 then regulates the operation of control 30 which in turn controls the mark-space ratio of SCR 12.

A contactor is coupled in shunt about SCR 12, and comprises contacts 34 and winding 36 in the manner of a relay. Switching means 38, here illustrated as another SCR, are provided to supply current to winding 36 for operating contacts 34.

Also coupled to potentiometer 32 is bypass switch 40. When bypass switch 40 is operated, in response to the attainment by potentiometer 32 of a predetermined setting, a timer 42 is energized. Override means 44, here disclosed as a switching transistor, are operated in response to the operation of timer 42 in order to effectively shunt bypass switch 40.

The operation of the disclosed system will now be discussed, making reference to the above-enumerated items in the FIGURE. When it is desired to operate the DC motor comprising armature 14 and field 16, the slider of potentiometer 32 is moved to a position where sufficient voltage is applied to control 30 to effect the gating of SCR 12. Since SCR 12 is in series relationship between the motor and the source of DC power, the average DC power appearing across the terminals of the motor is determined by the percentage of time that SCR 12 is conductive, known in the art as the mark-space ratio. A low mark-space ratio, corresponding to a low pulse rate of SCR 12 or, equivalently, to a pulse rate wherein the conductive interval of each period is small, applies only a low average voltage to the motor. As increased power is sought the slider of potentiometer 32 is manually adjusted to provide an increased voltage to control 30, culminating in an increase in the mark-space ratio of SCR 12.

After the SCR has been gated into conduction it is necessary to commutate the SCR to provide the "off time" of the cycle. As is known by those skilled in the art, once an SCR has begun to conduct and becomes forward-biased, it will continue to conduct in the absence of a gating pulse. Therefore, it is necessary to provide means for terminating current flow through the SCR or, equivalently, back-biasing the device. To this end, a commutation circuit comprising SCR's 24 and 26, inductor 28 and capacitor 22 is provided. Initially, current surges through SCR 24 to provide a positive charge to the upper plate of capacitor 22. Later, while SCR 12 is conducting, SCR 24 is turned off (commutated by the accrued charge on capacitor 22) and SCR 26 is gated on. The charge on capacitor 22 then reverses, the inductive effect of inductor 28 serving to "pump up" the charge so that a large positive potential is attained at the lower plate of capacitor 22. SCR 26 is then commutated by the reversed voltage, and capacitor 22 is in the proper condition to commutate SCR 12 upon energization of SCR 24.

When it is desired to apply full battery voltage across the traction motor, it has been found desirable to provide electromechanical means for shunting SCR 12. To this end, contacts 34 are coupled in shunt about SCR 12. A bypass switch 40 is coupled to speed control 32 so that when speed control 32 attains a predetermined position bypass switch 40 is activated to initiate operation of timer 42. In some electric vehicles, this arrangement is effected by coupling switch 40 in direct mechanical relationship with the movable portion of speed control 32. When the manual control is moved to its extreme "on" position, corresponding to the maximum speed adjustment, bypass switch 40 is then closed and initiates operation of timer 42. If the control remains in its maximum speed position for a predetermined period of time, long enough for timer 42 to have run its course or "timed out," the timer applies a signal to control 30 in order to inhibit commutation of SCR 12. A signal provided by the timer is also applied to SCR 28 in order to procure the closure of contacts 34. When contacts 34 are closed, an interlock (not shown) is operative to maintain coil 36 energized despite the subsequent opening of switch 40.

The reason for the presence of timer 42 is to prevent the closure of the bypass contacts in response to momentary or inadvertent movement of the speed control to its maximum position. By requiring a predetermined time to elapse before actuation of the contacts, some assurance is provided that the vehicle operator in fact intends that the vehicle operate in the bypass or full speed mode. A problem which has arisen with such a system, however, is the occurrence of a discontinuity or "jerk" in delivered power which abruptly takes up the accumulated clearances in the vehicle drive system, causing a severe gear slap which is detrimental to the drive system components. One approach developed in order to avoid this problem was to maintain the pulsed operation of SCR 12 until contacts 34 were fully closed. This, however, had attendant problems in that it did not always vitiate the gear slap and, furthermore, since closure of contacts 34 does not necessarily occur in synchronism with the commutation of SCR 12 commutating capacitor 22 was occasionally in the discharged state when contacts 34 closed, making it impossible to commutate SCR 12 when time-ratio control was reinstituted.

A solution to the foregoing problem, shown in the FIGURE, is to inhibit operation of SCR 26 to prevent commutation of SCR 12 by capacitor 22. The SCR then remains conductive until such time as contacts 34 close. With contacts 34 closed, all motor current is shunted about SCR 12; thus, commutation takes place without the use of the normal commutation circuit. The charge on capacitor 22 is preserved, and the commutating circuit is in readiness for use when time-ratio operation is reinstituted. However, a problem inheres in this approach in that a slight time delay, of the order of magnitude of 40 milliseconds, occurs between the time that switch 38 is first energized and the time at which contacts 34 close. This is due to the time required for current which has commenced to flow through an inductive element such as winding 36 to attain a predetermined value. Thus after timer 42 has timed out, a period commonly on the order of magnitude of one and a half or two seconds, and the commutation of SCR 12 is inhibited, there is thereafter a short period of time in which bypass switch 40 must remain closed in order to assure the operation of contacts 34. Unfortunately, despite the brief duration of this additional time period it has been found that in practice vehicle operators frequently move the speed control adjustment from its maximum position, thus opening switch 40, in the brief period subsequent to the timing out of timer 42 and the full energization of coil 36. In this case SCR 12 continues to conduct since commutation thereof has already been inhibited by timer 42; yet contacts 34 have not been closed. If prolonged, continuous conduction of SCR 12 would be highly detrimental to the SCR; in fact, pulse monitoring circuits are generally provided in electric vehicle time-ratio control systems which prevent destruction of the SCR by reinstituting commutation, or by temporarily shutting the control system down. Either of these alternatives are obviously undesirable during operation of a vehicle, requiring that the vehicle be slowed or stopped until the aberrant condition is rectified.

In order to avoid the problem described above, the present invention contemplates the provision of override means 44 which shunt bypass switch 40, effectively continuing the operation thereof for the additional time needed to effect the closure of contacts 34 once timer 42 has timed out. Thus, once switch 40 is closed and timer 42 runs its course override means 44 is energized so that, even should switch 40 be deactivated immediately after the timing out of timer 42, the timer will not be disabled and the contactor will continue to be energized. Full current flow may thus be achieved through windings 36, operating bypass contacts 34 and placing the system in the bypass operation mode.

As will be evident from the foregoing description, certain aspects of the invention are not limited to the particular details of the examples illustrated, and it is therefore contemplated that other modifications or applications will occur to those skilled in the art. For instance, the timer 42 might be energized by the opening, rather than closing, of bypass switch 40. In this case, override means 44 could then be placed in series with switch 40, and rendered non-conductive when timer 42 has timed out. Similarly, other ways of continuing the operation of timer 42 may be provided, once the timer has timed out and commutation of SCR 12 has been inhibited. It is accordingly intended that the appended claims shall cover all such modifications and applications as do not depart from the true spirit and scope of the invention.

What is claimed as new and desired to be secured by Letters Patent of the United States is:

1. In a time-ratio control system for controlling the operation of an electric vehicle and including a gated thyristor, control means for commutating the thyristor and for varying the markspace ratio thereof, and bypass means operable to shunt the thyristor, said bypass means requiring a first time period for complete energization thereof, timer means operable after a second period of time to inhibit commutation of the thyristor and to commence energization of the bypass means;

switching means operably coupled to the control means for energizing said timer means in response to the attainment by said control means of a predetermined state; and override means for maintaining the energization of the bypass means for at least said first time period despite the retreat of said control means from said predetermined state after the expiration of said second predetermined time period.

2. The invention defined in claim 1, wherein said control means includes manually-displaceable means, said switching means being operatively coupled to said manually displaceable means.

3. The invention defined in claim 2, wherein the thyristor is an SCR.

4. The invention defined in claim 3, wherein said override means is coupled in circuit with said switching means, and maintains the effect thereof for a predetermined period regardless of displacement of said manually-displaceable means after said second predetermined period of time.

5. In a control system for electric vehicle including a thyristor for intermittently coupling and decoupling a traction motor to a source of dc power, a gating control for energizing and deenergizing the thyristor, speed control means coupled to the gating control for varying the mark-space ratio of conductivity of the thyristor, and a bypass contactor coupled in shunt about the thyristor, said bypass contactor including a pair of contacts and a control winding and requiring a first period of time after application of power to said winding for closure of the contacts, the improvement comprising:

timing means coupled to the gating control and bypass contactor and energizable to inhibit commutation of the thyristor and to apply power to the winding of said contactor a second, predetermined period of time after application of an enabling signal thereto:

switching means associated with the speed control means for energizing said timer in response to the attainment by said speed control means of a predetermined status; and override means operated by said timer to prevent the removal of power from said control winding for at least said first period of time after the application of power to said winding.

6. The invention defined in claim 5, wherein said speed control comprises a variable resistance, said switching means being operated when said speed control is manually displaced to a predetermined position.

7. The invention defined in claim 6, wherein said predetermined position corresponds to the maximum speed adjustment.

8. The invention defined in claim 6, wherein said override means is operable to continue the effect of said switching means upon said timer.

* * * * *